Patented Apr. 2, 1929.

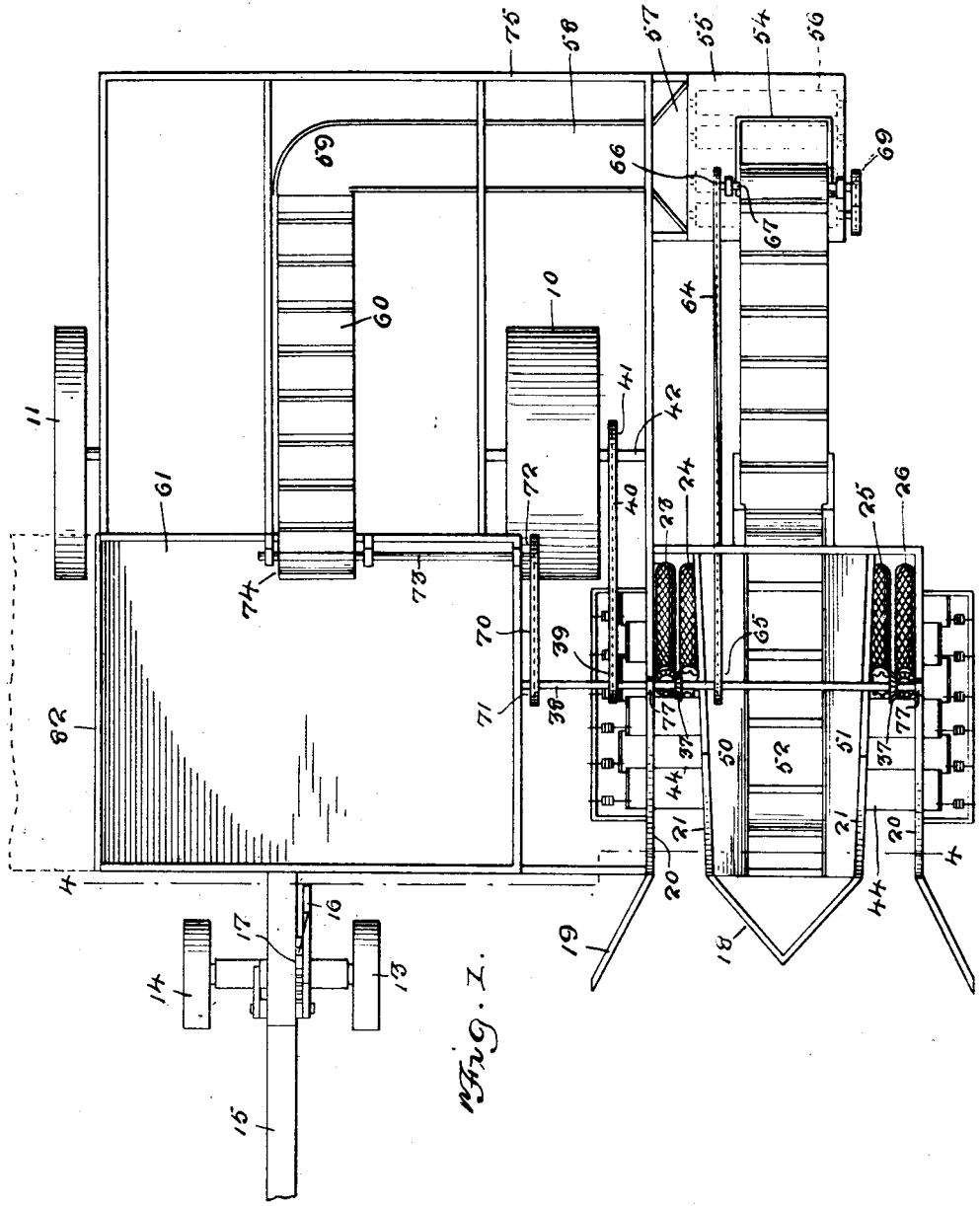

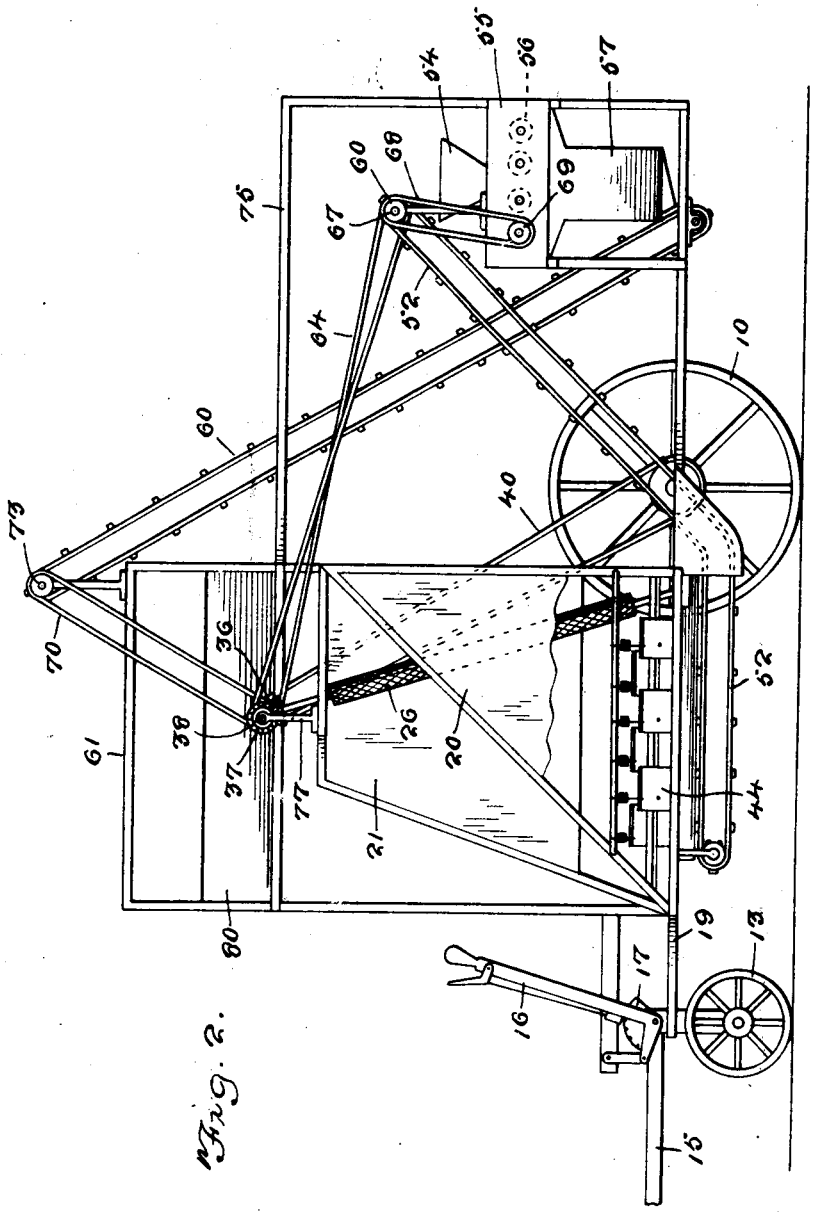

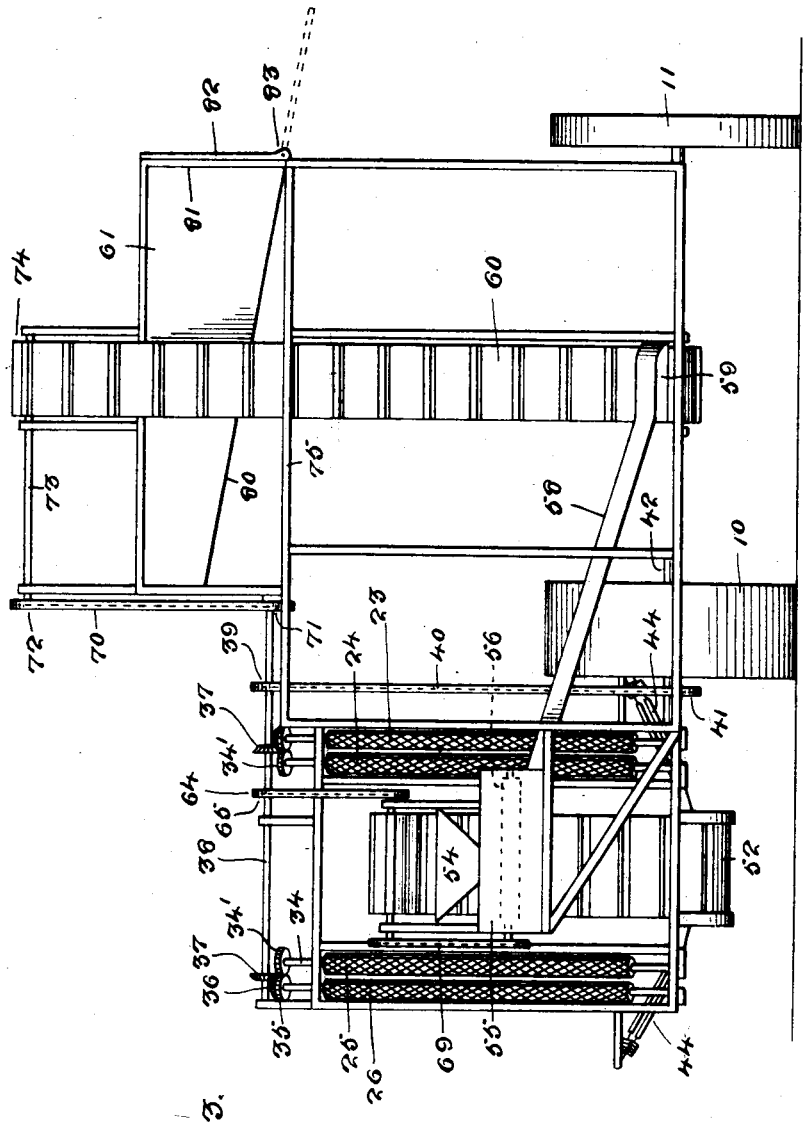

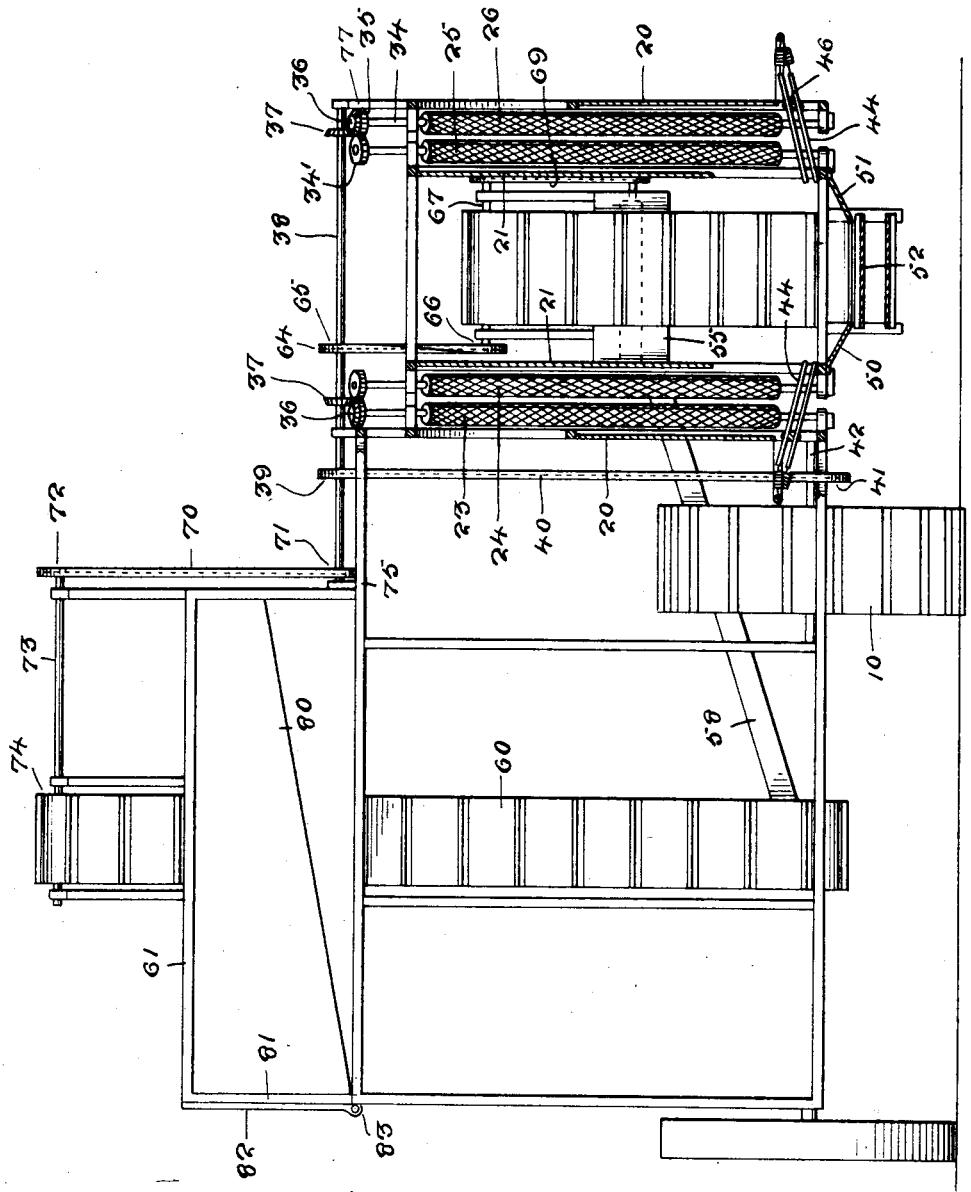

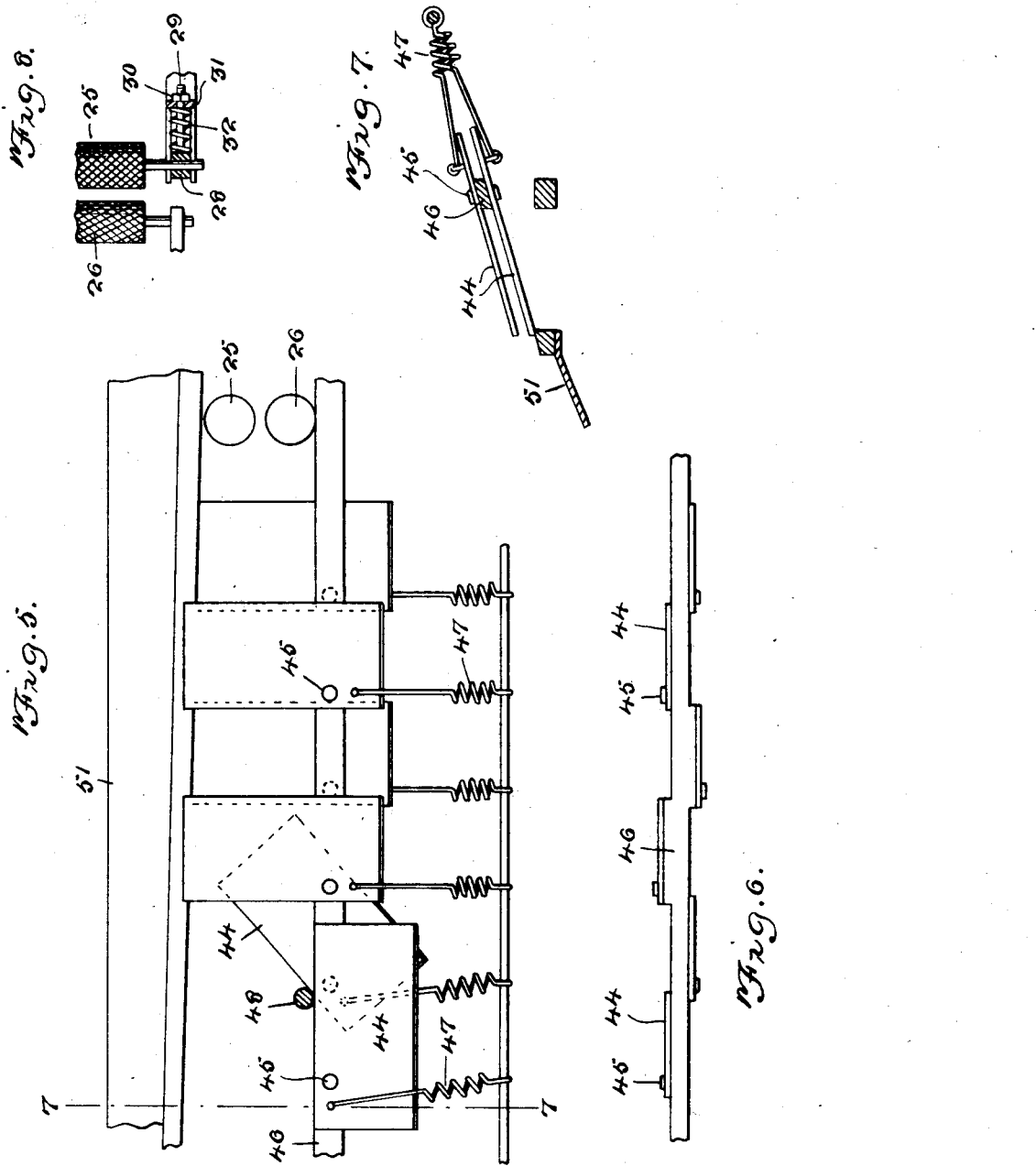

1,707,875

UNITED STATES PATENT OFFICE.

GEORGE G. REICHENEKER, OF LAURA, ILLINOIS.

CORN HARVESTER.

Application filed April 2, 1926. Serial No. 99,336.

The object of this invention is to provide a machine for separating the ears of corn from the stalks by means of a plurality of pairs of rollers spaced for caring for two rows of corn, and mounted in a special manner, the ears being conveyed to husking rollers and passing thence thru a chute, to an elevator, by which they are carried to a corn bin, mounted on the frame of the machine.

A further object is to provide for mounting the picking rollers with their upper portions overhanging the lower portions, so that the action of the rollers is in a downward direction, for forcing the ears from the leaves or shucks, or breaking them off together, thus providing a positive separating movement.

A further object is to provide for the relative spacing of the lower ends of the rollers which separate the ears from the stalks.

A further object is to provide particular means for saving ears which might otherwise fall to the ground in front of the picking rollers, these means including a series of pivotally mounted and resiliently held gates, or plate members, operating successively, and permitting the stalks to pass thru the series, horizontally, without allowing the ears to drop downwardly, the corn thus held passing transversely over pans to a rearwardly moving conveyor.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a top plan view of the machine.

Figure 2 is a view in side elevation.

Figure 3 is a view in rear elevation.

Figure 4 is technically a view on line 4—4 of Figure 1, several of the important elements of the construction being in front elevation.

Figure 5 is a plan view of the series of pivoted plates or gates adapted to be engaged by the stalks, as the machine moves forwardly, the gates at once resuming normal position under the action of the springs, and the ears falling on the gates being prevented from dropping to the ground.

Figure 6 is an edge elevation of the structure of Figure 5.

Figure 7 is a section on line 7—7 of Figure 5.

Figure 8 is a detail view showing the devices for adjusting the lower bearing of one of the vertical or upwardly extending picking rollers.

The main structure is carried on wheels 10 and 11, a forward truck including the wheels 13 and 14, a tongue being designated 15, and a lever for controlling elevation being shown at 16 and including the usual retaining device cooperating with a segment 17.

The stalks are guided by means of the fenders or guiding devices 18 and 19, and the stalks pass rearwardly between the elements 20 and 21, to the picking rollers 23 and 24. Other rollers 25 and 26 are similarly mounted on the other side of a travelling element, all of the rollers being inclined at about the angle shown in Figure 2, in order that the action of the rollers may be in a downward direction for forcing the ears from the leaves or shucks, or breaking them off together, as previously indicated. The rollers are provided with roughened surfaces of the form shown, and cut as in the case of a rasp or file, the individual elements between the channels being, say, one-quarter of an inch in length.

The rollers are mounted in spaced relation, but the space between the rollers of each pair, at the tops thereof, remains the same, while the distance between the rollers at the lower ends may be varied by providing an adjustable bearing box designated 28, in Figure 8, and movable by means of the adjusting devices there shown. The stem 29 connected with box 28 carries a nut 30 bearing on a stationary member 31, so that when the nut is screwed up the spring 32 will be placed under compression, and the lower end of the roller controlled in this manner will be spaced to a greater extent from the adjacent roller. The space between the rollers of each pair may thus be varied to permit the stalks to pass between the rollers, the ears being broken off.

The shafts 34 of the rollers are geared together, that is the rollers of each pair are thus geared, as shown in Figure 3, and rigid with reference to one of the gear wheels 35 is a bevelled gear wheel 36 meshing with gear wheel 37 on shaft 38. The gear wheel on one shaft 34 is designated 34', and meshes with gear wheel 35. The picking rollers of the other pair are similarly rotated from shaft 38, and the latter carries sprocket wheel 39 driven by chain 40, the latter passing around a sprocket wheel 41 on shaft 42 constituting an axle.

In order to prevent any of the ears from falling to the ground, in front of the rollers just referred to, that is rollers 23, 24, 25, 26, I provide a series of horizontal extending plates, or gates, these elements being designated 44, and each being pivoted at 45, on a bar 46 and normally held by spring 47, in a position perpendicular to the path of travel of the stalks. The manner of operation of these devices, 44, is shown in Figure 5, and a stalk 48 is illustrated as in engagement with one of the plates 44 which has been moved entirely out of the path of travel of the stalks, and the stalk 48 has begun to throw the next plate 44 to a similar position, so that there is no material obstruction to the movement of the stalks relative to the machine, but the plates 44, as they swing back successively to normal position catch the ears separated from the stalks, and prevent the major portion of them from reaching the ground. The ears pass in a transverse direction over pans 50 and 51 to the travelling element 52 by which they are carried rearwardly. In connection with the structure of Figure 5, reference should also be made to Figures 6 and 7, showing the plates as being affixed to the upper and lower surfaces or bar 46, that is, alternate plates are on the upper side and the remaining plates are on the lower side.

The conveyor or travelling element 52 moves horizontally for a given distance, and is then guided in an upward direction, for carrying the ears to the hopper 54, connected with the housing 55 in which the husking rollers 56 are mounted. After engagement with these rollers 56 by which the husking operation is effected, the ears pass thru the chute 57, and pass thence to the transversely extending chute 58 from which they are discharged at the point 59 to the elevator or elevating conveyor 60. The latter discharges at a point above the top of the bin 61 carried by the main structure.

The drive for conveyor 52 is thru chain 64 and sprocket wheel 65 on shaft 38, chain 64 driving a wheel 66 on shaft 67. From the shaft last named a chain 68 drives one of the husking rollers thru sprocket wheel 69. The remaining husking rollers are to be driven from shaft 69 by suitable gearing.

Shaft 38 also drives a chain 70 thru sprocket wheel 71, and the chain passes over sprocket wheel 72 on shaft 73 mounting a roller 74 for driving elevating conveyor 60.

In Figure 2, a main vertical side frame is designated 75, and a frame 76 extends in the position shown with reference to the picking rollers and mounts a bearing bracket 77 for transverse shaft 38. Frame 76 is braced as shown at 78.

The corn bin 61 is provided with an inclined bottom 80, and a doorway 81 is closed by an end gate or the like designated 82, and pivotally mounted at 83. This gate 82, when open, constitutes a chute or discharge element over which the material is delivered to a wagon.

It will therefore be observed that I have provided a two-row machine, the mechanism on one side of the conveyor 62 being duplicated on the opposite side, and the purpose has been to accomplish the results sought with a minimum number of movable elements, and other construction, while at the same time, a highly efficient machine is produced, especial reference being made to the points of novelty heretofore emphasized.

Having thus described the invention, what is claimed is:

1. In a machine of the class described, a main structure, a conveyor movable rearwardly therein, pans on opposite sides of the forward portion of the conveyor and downwardly inclined toward the surface thereof, pairs of rollers mounted along side of the conveyor and pans and on opposite sides thereof, and a series of horizontally and transversely extending plates in front of each pair of rollers, and normally projecting across a median line between the rollers, said plates each being pivotally mounted on vertical axes.

2. In a machine of the class described, a main structure, a conveyor movable rearwardly therein, pans on opposite sides of the forward portion of the conveyor and downwardly inclined toward the surface thereof, pairs of rollers mounted along side of the conveyor and pans and on opposite sides thereof, a series of horizontally and transversely extending plates in front of each pair of rollers, and normally projecting across a median line between the rollers, said plates each being pivotally mounted on vertical axes, and means for resiliently holding the plates in parallel relation.

3. In a machine of the class described, a main structure, a conveyor movable rearwardly therein, pans on opposite sides of the forward portion of the conveyor and downwardly inclined toward the surface thereof, pairs of rollers mounted along side of the conveyor and pans and on opposite sides thereof, a series of horizontally and transversely extending plates in front of each pair of rollers, and normally projecting across a median line between the rollers, said plates each being pivotally mounted on vertical axes, adjacent plates overlapping each other.

4. In a machine of the class described, a main structure, a conveyor movable rearwardly therein, pans on opposite sides of the forward portion of the conveyor and downwardly inclined toward the surface thereof, pairs of rollers mounted along side of the conveyor and pans and on opposite sides thereof, and a series of horizontally and transversely extending plates in front of each pair of rollers, and normally projecting across a median line between the rollers, a bar for mounting each series of plates, and permitting individual movement of the plates with reference to the bar, adjacent plates being positioned on opposite sides of the respective bars, and in overlapping relation.

5. In a machine of the class described, a main structure, a conveyor movable rearwardly therein, pans on opposite sides of the forward portion of the conveyor and downwardly inclined toward the surface thereof, a pair of rollers mounted along side of the conveyor and pans and on opposite sides thereof, and a series of horizontally and transversely extending plates in front of each pair of rollers, and normally projecting across a median line between the rollers, a bar for mounting each series of plates, and permitting individual movement of the plates with reference to the bar, adjacent plates being positioned on opposite sides of the respective bars, and in overlapping relation, and means for resiliently holding the plates.

6. In a machine of the class described, pairs of picking rollers, a series of horizontally and transversely extending plates mounted in front of the rollers, adjacent to the lower portions thereof, means for pivotally mounting the plates in overlapping relation, and means for resiliently holding the plates in position for normally forming a substantially continuous supporting surface across a median line between the rollers.

7. In a machine of the class described, a main structure, a pair of rollers positioned for engagement by the stalks upon the forward movement of the machine, said rollers being inclined upwardly and forwardly, means for driving the rollers, a series of horizontally extending plates, perpendicular to the path of travel of the stalks toward the rollers, the plates normally extending and being movable across that path and devices for independently and resiliently mounting the plates for operation successively, upon engagement by the stalks.

8. In a machine of the class described, a main structure, a conveyor movable rearwardly therein, pairs of rollers mounted along side of the conveyor and extending upwardly and forwardly with reference thereto, means for driving the conveyor, and means in front of the rollers for forming a supporting surface, said means comprising a series of plates mounted for movement about independent axes, and a resilient device connected with each plate, permitting the aforesaid movement thereof, and acting to return the plates to normal position, said plates providing a substantially continuous surface transversely of a median line between the rollers.

9. In a machine of the class described, a main structure, a conveyor movable rearwardly therein, rollers mounted along side of the conveyor and extending upwardly and forwardly with reference thereto, pivoted ear receiving elements normally extending across the path of the stalks, a series of husking rollers to which the ears, separated from the stalks, by the rollers first named, are discharged, a chute leading from a point below the husking rollers, and elevating conveyor receiving material from the chute, a bin into which the elevating conveyor discharges, and means permitting the discharge of material from the bin.

In testimony whereof I affix my signature.

GEORGE G. REICHENEKER.